(12) United States Patent
Ro et al.

(10) Patent No.: US 6,288,989 B1
(45) Date of Patent: *Sep. 11, 2001

(54) INFORMATION RECORDING METHOD WITH PROTECTION FUNCTION OF PREVIOUSLY RECORDED INFORMATION

(75) Inventors: Jin Tae Ro, Seoul; Dong Cheol Kang, Kyungki-do; Jae Hyoung Lee, Seoul; Tae Joon Park, Seoul; Kang Soo Seo, Seoul, all of (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/757,823

(22) Filed: Nov. 27, 1996

(30) Foreign Application Priority Data

Nov. 2, 1996 (KR) .................................................. 96-51668

(51) Int. Cl.[7] .................................................. G11B 7/006
(52) U.S. Cl. ..................................... 369/47.13; 369/53.21
(58) Field of Search ................................. 369/32, 54, 58, 369/275.3, 84, 52, 53, 47–48, 59, 47.13, 53.21, 53.31, 59.25; 360/53, 60, 25, 9, 4, 21, 23

(56) References Cited

U.S. PATENT DOCUMENTS

| | | | |
|---|---|---|---|
| 4,891,504 | * | 1/1990 | Gupa ........................................ 369/52 |
| 5,058,096 | * | 10/1991 | Ando et al. ............................. 369/53 |
| 5,107,481 | * | 4/1992 | Miki et al. .............................. 369/59 |
| 5,124,963 | * | 6/1992 | Ando ...................................... 369/54 |
| 5,233,576 | * | 8/1993 | Curtis et al. ............................ 369/53 |
| 5,283,779 | * | 2/1994 | Otsuki .................................... 369/53 |
| 5,446,857 | * | 8/1995 | Russ ....................................... 369/53 |
| 5,453,968 | * | 9/1995 | Veldhuis et al. ....................... 369/53 |
| 5,570,339 | * | 10/1996 | Nagano ............................. 369/275.3 |
| 5,587,849 | * | 12/1996 | Kori et al. .............................. 369/58 |
| 5,602,916 | * | 2/1997 | Grube et al. ........................... 380/21 |
| 5,617,407 | * | 4/1997 | Bareis .................................... 369/58 |
| 5,654,950 | * | 8/1997 | Itoh ........................................ 369/58 |
| 5,659,613 | * | 8/1997 | Copeland et al. .................... 360/60 |
| 5,661,703 | * | 8/1997 | Moribe et al. ......................... 369/58 |
| 5,663,946 | * | 9/1997 | Ohtomo ................................. 369/58 |
| 5,694,381 | * | 12/1997 | Sako ...................................... 369/58 |
| 5,796,825 | * | 8/1998 | McDonnal et al. ................... 380/25 |
| 5,818,812 | * | 10/1998 | Moribe et al. .................... 369/275.1 |

FOREIGN PATENT DOCUMENTS 7-319635 * 8/1995 (JP) ....................................... 369/53

OTHER PUBLICATIONS

Patent Abstracts of Japan, vol. 98, No. 10, JP 10–285517, patent document published Oct. 23, 1998.*

* cited by examiner

Primary Examiner—W. R. Young

(57) ABSTRACT

An information recording method which can record audio and/or video information on a recording medium, while protecting previously recorded information from being overwritten. When recording new information on the record medium, the information recording method checks whether an intended recording position for new information corresponds to a start position of a previously recorded information region. If so, the method moves the recording position of new information into a recording termination position of the previously recorded information region.

12 Claims, 10 Drawing Sheets

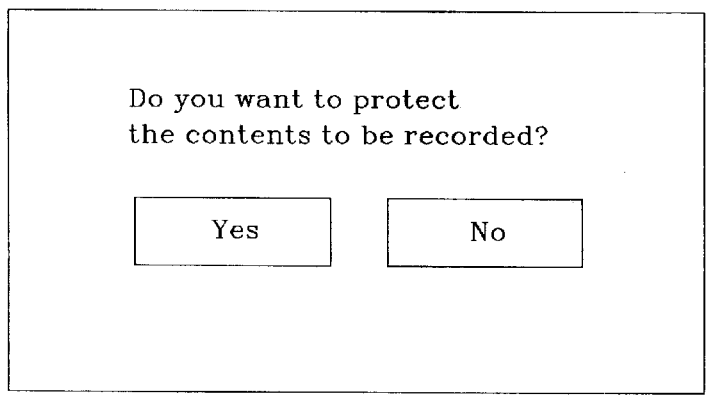
Fig.3
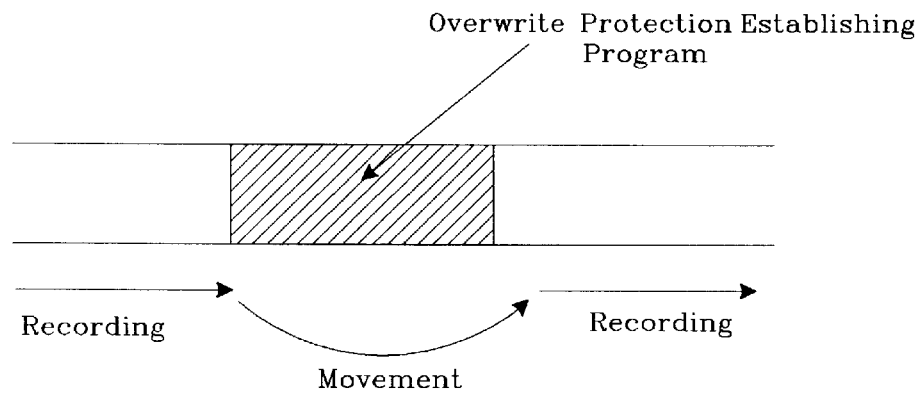
Fig.4
Fig.5

| Program | Record time | Erasure Priority |
|---|---|---|
| Program1 | 00:10:05 | 5 |
| Program2 | 00:30:10 | 1 |
| Program3 | 00:20:00 | 4 |
| Program4 | 00:60:10 | 2 |
| Program5 | 00:00:00 | 3 |

INFORMATION RECORDING METHOD WITH PROTECTION FUNCTION OF PREVIOUSLY RECORDED INFORMATION

BACKGROUND OF THE INVENTION

1. Field of the Invention

This invention relates to a method of recording audio and/or video information on the record medium, and more particularly to an information recording method wherein recorded audio and/or video information may be protected from being overwritten.

2. Description of Prior Art

Recently, in addition to conventional floppy discs, discs have been employed as recording mediums for recording audio and/or video information. Of the above record media, the optical disc has been recognized as the best recording medium based on its resistance to losses of information caused by a deterioration of sound and picture quality, scratching and the like, as well as easy random access and relatively large storage capacity. On the other hand, the floppy disc has less bulk in comparison with both the audio cassette tape and video cassette tape. These recording media have led to various developments in audio and/or video information recording apparatuses. Such a sound and/or image information recording apparatus includes an audio cassette recorder for driving an audio tape, a video cassette recorder for driving a video tape, a disc driver for driving a floppy disc an optical disc recorder for accessing an optical disc optically, etc.

Because the above-described recording media tends to have a large scale of storage capacity, it became possible to write a number of audio programs or a number of video programs onto the record media. Accordingly, each time desired audio and/or video programs were generated, a user had recorded the programs on a single record medium. Since recording operations were performed in a single record medium several times as mentioned above, valuable video and/or audio information previously recorded on the record medium were frequently lost. This results from a new program being record overwritten on the previously recorded program. Accordingly, users began to want to protect any valuable information or programs previously recorded on the record medium.

For the purpose of protecting the audio and/or video information or program previously recorded on the record medium, mechanical recording prevention tabs are frequently installed in the enclosure of record medium. In fact, the video and audio cassette tapes restrict a recording of video and/or audio information, in accordance with whether there is the recording prevention tab in the cassette or not. In other words, if the recording prevention tab is attached in the recording medium, then the audio and/or video information is recorded on the audio and video cassette tapes; whereas if it is removed from the cassette, then the audio and/or video information is not recorded on the audio and video cassette tapes. Similarly, the floppy disc restricts a recording of information in accordance with a position of the recording prevention tab installed to a caddie or a jacket.

However, the above method which prevents a recording by exploiting the mechanical recording prevention tab, brings about an unnecessary waste in the storage area of recording medium because information is not recorded with reference to the entire storage area of recording medium. Rather, a portion of the storage area of the record medium is generally not utilized when the recording prevention tab is installed. Also, the method of preventing a recording by exploiting the mechanical recording prevention tab has a disadvantage in that, since information unnecessary to a user occupies a portion of the storage area of record medium, the utilization efficiency of the storage area is deteriorated largely.

SUMMARY OF THE INVENTION

Accordingly, it is an object of the present invention is to provide an information recording method which establishes a protection mode for preventing the overwriting of audio and/or video information recorded on a record medium.

It is another object of the present invention to provide an information recording method which can protect previously recorded information by recording audio and /or video information on a record medium indicating that the previously recorded information should not be overwritten.

It is yet another object of the present invention to provide an information recording method which can improve a utilization efficiency of a storage area of record medium by recording new information, instead of the previously recorded information, on the record medium.

In order to obtain the above and other objects, an information protection mode establishing method according to one aspect of the present invention comprises the steps of selecting whether to protect information to be recorded during initiation of recording; storing into a memory start position data relating to a start position of the recording medium on which the information is recorded, and the selected protection or non-protection into a memory; and recording termination position data relative to an end point of a storage area of the record medium on which the information is recorded, and the start position data and the selected protection or non-protection stored in the memory on a specific storage area of the record medium during termination of the recording.

Further, an information protection mode modifying method according to another aspect of the present invention comprises the steps of establishing a modification mode for changing the protection of information; reproducing a plurality of overwriting prevention information relating to corresponding information stored in a specific storage area of the record medium; storing the plurality of overwriting prevention information into a memory to thereby display a protection or non-protection of the plurality of information; selecting any one of the plurality of information and inputting a change instruction relative to the protection or non-protection; storing the change instruction into said memory to update a protection or non-protection of the selected information; and recording the plurality of overwriting prevention information stored in the memory into a specific storage area of the record medium.

Furthermore, an information recording method with a function of protecting previously recorded information according to yet another aspect of the invention the steps of retrieving recording start position data and recording termination position data relative to a plurality of previously recorded information from a specific storage area of the record medium in response to a recording instruction; checking whether a recording position of new information is a position on the recording medium corresponding to any one of the retrieved recording start position data, in the course of recording said new information on the record medium; and moving the recording position of the new information to a position of the record medium corresponding to any one of the retrieved recording termination position data.

Furthermore, an information recording method with a function of protecting previously recorded information according to still another aspect of the invention comprises the steps of retrieving recording start position data and recording termination position data relative to a plurality of previously recorded protection mode information from a specific storage area of the record medium in response to a recording instruction; checking whether a recording position of new information is a position of the record medium corresponding to any one of the retrieved recording start position data, in the course of recording the new information on the record medium; and moving the recording position of the new information into a position of the record medium corresponding to any one of the retrieved recording termination position data.

Moreover, an information recording method with a function of protecting previously recorded information according to still another aspect of the invention comprises the steps of retrieving priority values, recording start position data and recording termination position data relative to a plurality of previously recorded information from a specific storage area of the record medium in response to a recording instruction; checking whether a recording position of new information is a position of the record medium corresponding to any one of the retrieved recording start position data, in the course of recording the new information on the record medium; and selectively moving the recording position of the new information into a position of the record medium corresponding to the retrieved recording termination position data, in accordance with a priority value of the information previously recorded on the position of the record medium.

BRIEF DESCRIPTION OF THE DRAWINGS

These and other objects of the invention will become apparent from the following detailed description of the embodiments of the present invention with reference to the accompanying drawings, in which:

FIG. 3 shows a display scene of a set request message for an information protection function.

FIG. 4 shows s display scene of protection states of the previously recorded programs.

FIG. 5 explains a state in which information is record on a record medium in accordance with the first embodiment of the invention.

DETAILED DESCRIPTION OF THE PREFERRED EMBODIMENT

Figure 1:
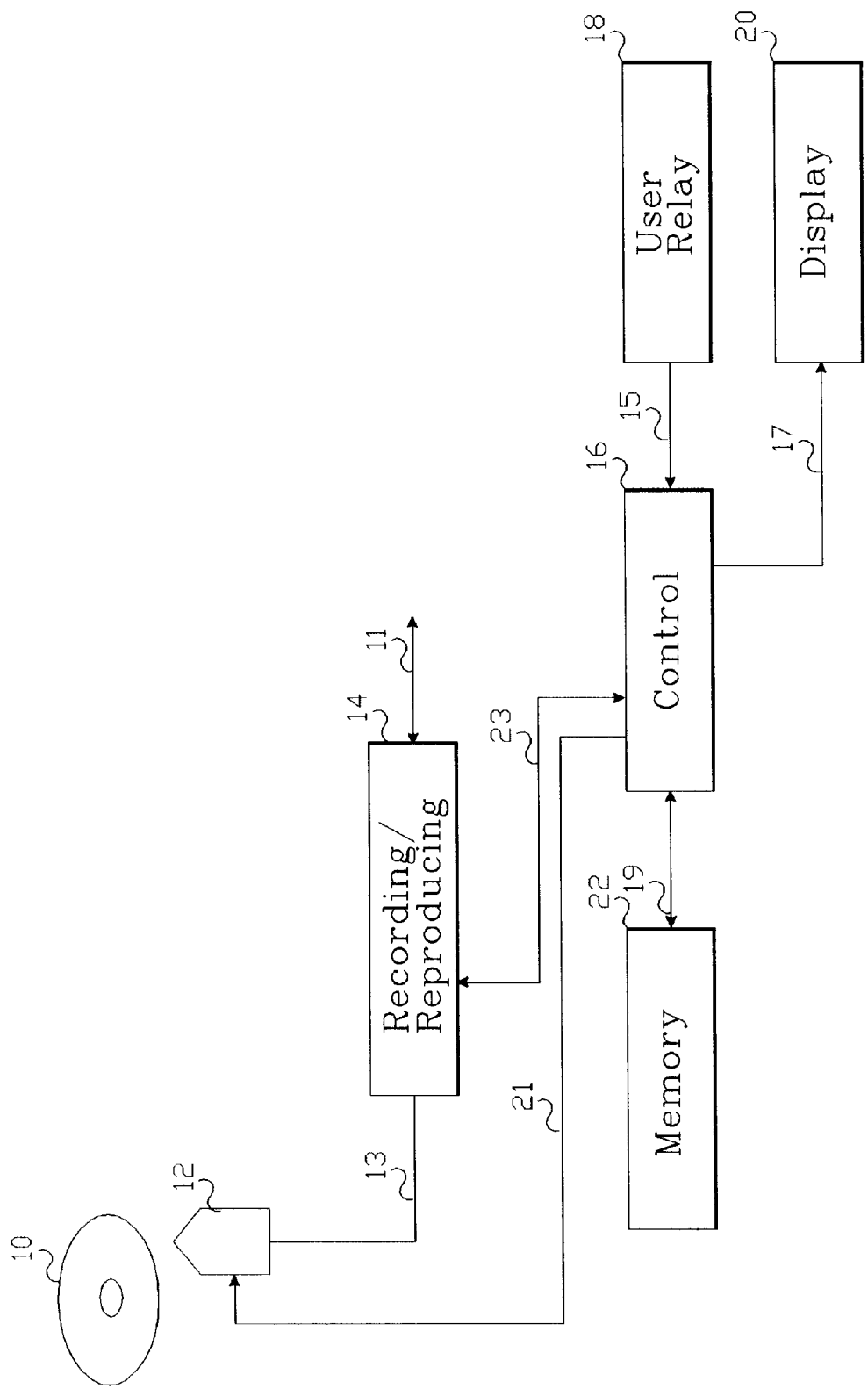
FIG. 1 is a schematic block diagram of a conventional optical disc recording and reproducing apparatus.

Referring to FIG. 1, there is shown a conventional optical disc recording and reproducing apparatus which comprises an optical pickup device 12 for accessing an optical disc 10 optically and recording/reproducing portion 14 connected between an input/output line 11 and the optical pickup device. During reproduction, the optical pickup device 12 irradiates a relatively small-energy light beam on a surface of the optical disc 10 and a radio frequency signal (RF signal) is generated based on a light beam reflected by the optical disc 10. The RF signal is applied via the first node 13 to the recording/reproducing portion 14. On the other hand, during a recording operation, the optical pickup device 12 irradiates a relatively large energy of light beam that is switched in response to a data stream from the recording/reproducing portion onto the surface of the optical disc 10 in order to record audio and/or video information on the optical disc. Also, the optical pickup device 12 generates a RF signal for support signal by a beam reflected from the optical disc 10 and supplies the RF signal to the recording/reproducing portion 14.

In the recording mode, the recording/reproducing portion 14 adds a support signal to the recording data from the input/output line 11 and formats the data including the support signal in the pattern required by the optical disc 10, thereby generating the data stream. This data stream is transferred via the first node 13 into the optical pickup device 12 per each unit of the sectors dividing the information track of the optical disc by a certain size. In this sector is included position information indicating the physical position of the sector, synchronous information indicating the rotation velocity of optical disc, and scene data. The support signal is used to reproduce the RF signal for support signal applied from the optical pickup device 12. It includes physical position information on the information track of optical disc and a synchronous pattern indicating the rotation velocity of optical disc, etc.. Otherwise, in the reproduction mode, the recording/reproducing portion 14 reproduces a RF signal for data input via the first node 13 from the optical pickup device 12 to restore the data stream, and then separates the position information, the synchronous pattern and the data from the reproduced data stream. The reproduced data is sent via the input/output line 11.

The optical disc recording and reproducing apparatus comprises a controller 16 for controlling the optical pickup device 12 and the recording/reproducing portion 14, a user relay 18 connected with the controller 16, a display 20 and a memory 22. The user relay 18 receives a protection instruction of record, reproduction or program, i.e. recording information, and user information relative to the program to be protected, etc. The user relay 18 then supplies the received instruction via the second node 15 to the controller 16. The display 20 provides the user with a visual report of the information supplied to the controller 16, for example a menu for selecting the protection function, and protection and non-protection program lists, etc. For this purpose, the display 20 inputs displaying data via the third node 17 from the controller 16 and displays the displaying data on a screen thereof. The memory 22 connected with controller 16 via the fourth node 19 temporarily stores the data supplied by the controller 16.

The controller 16 controls the optical pickup device 12 via the fifth node 21, thereby allowing an energy level of the light beam generated at the optical pickup device 12 to vary in accordance with the recording and reproduction mode and, at the same time, allowing the optical pickup device 12 to locate a storage area of the optical disc to be accessed. The controller 16 controls the operation mode of the recording/reproducing portion 14 via the sixth node 23, and generates the lead-in information to be recorded on the lead-in area of the optical disc 10.

Figure 2A:
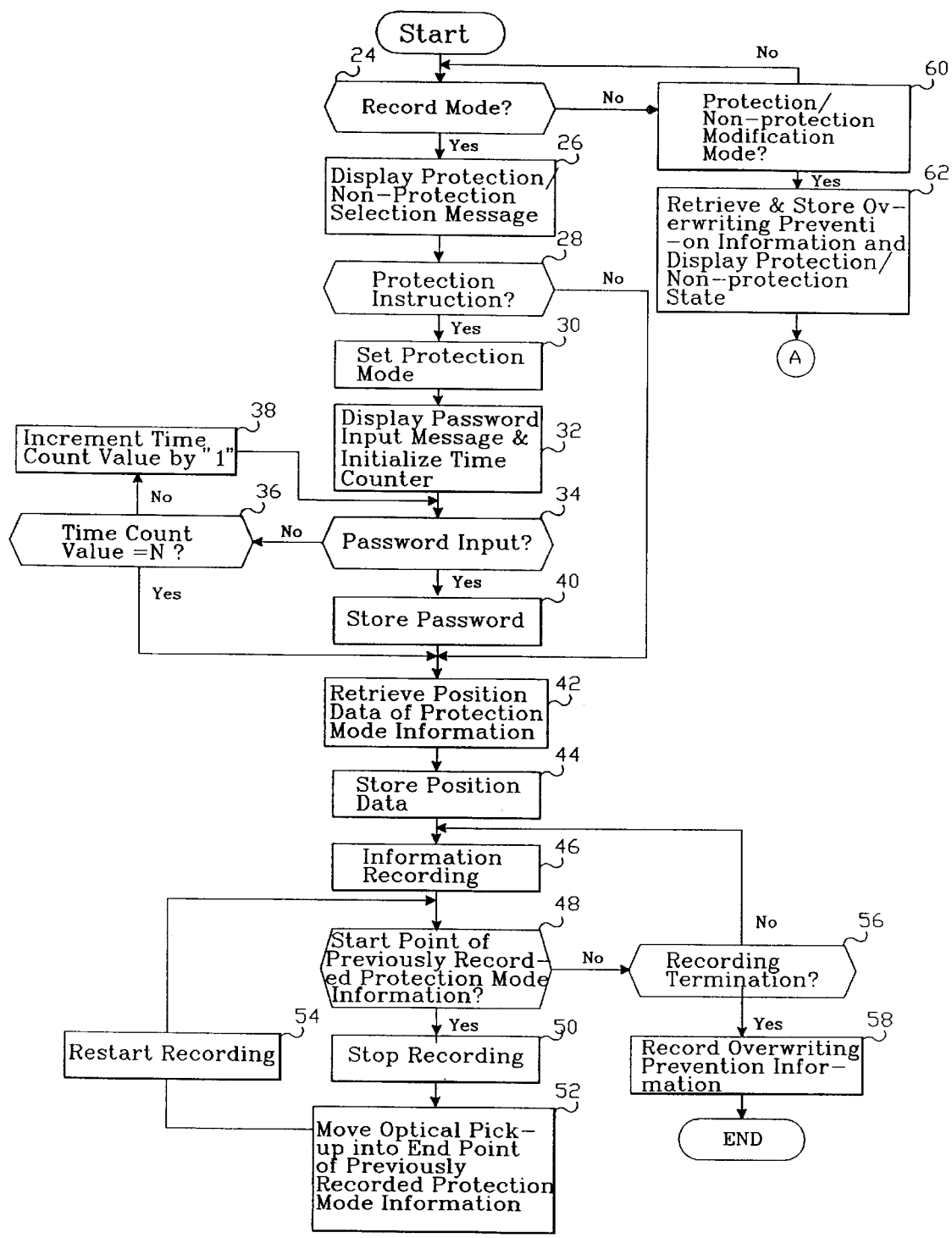
FIGS. 2a and 2b collectively illustrate a flow chart for explaining an information recording method with a protection function of the previously recorded information according to the first embodiment of the present invention.
Figure 2B:
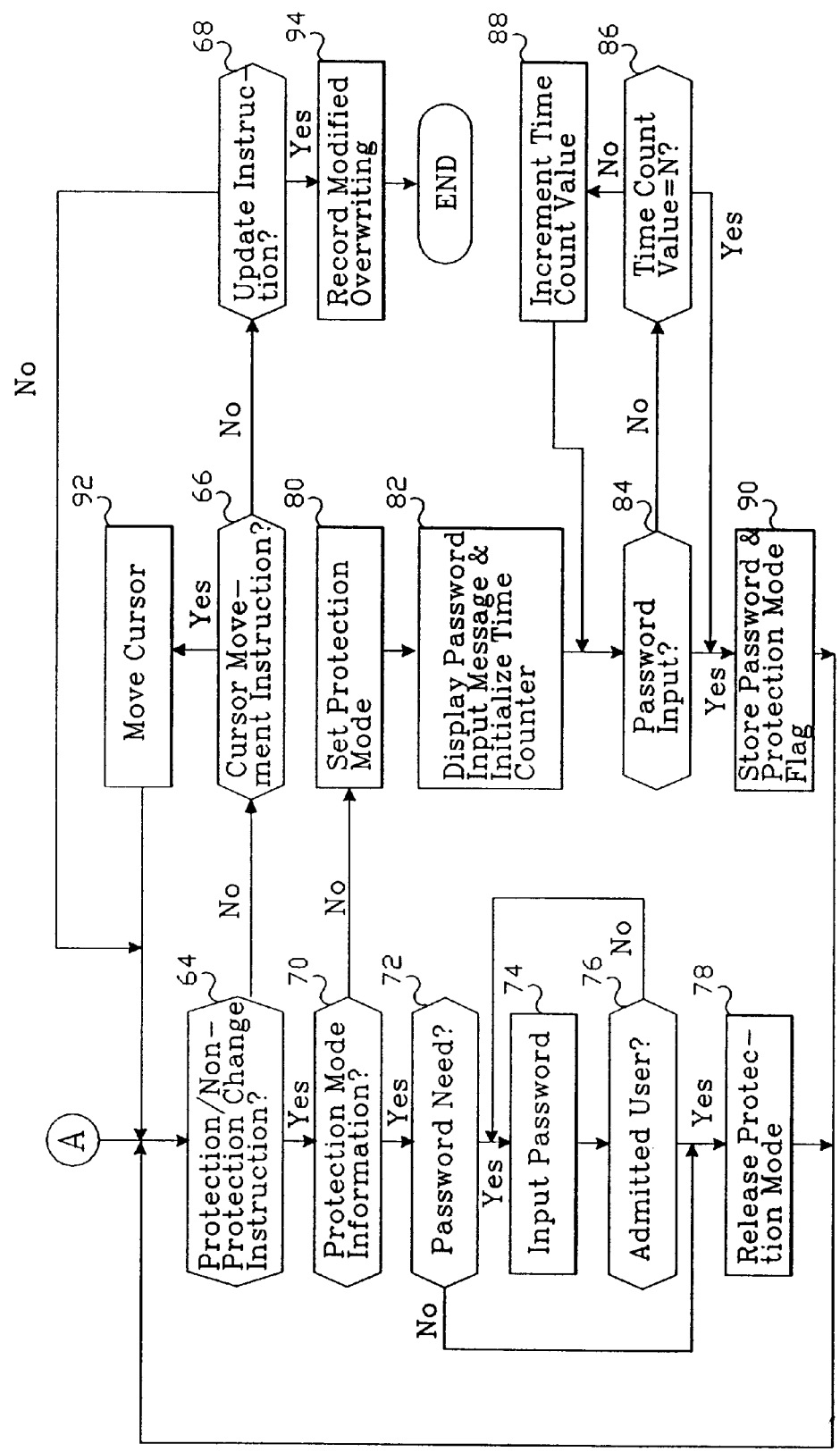

FIGS. 2a and 2b collectively illustrate a flow chart for explaining an information recording method with a function for protecting previously recorded information, according to the first embodiment of the present invention. The process in FIGS. 2a and 2b is performed by the controller 16 as shown in FIG. 1.

Firstly, with reference to FIG. 2a, in the step 24, the controller 28 checks a logical state of a recording mode flag allocated to a register thereof, and then decides whether the recording mode was set. This recording mode flag is set to "1" when a recording instruction is inputted from the user relay 18, and thereafter is reset to "0" when other recording medium driving instructions such as a stop instruction or a reproducing instruction are inputted. If the record mode was set, that is, the record mode flag is set to "1" in the step 24, then the controller 16 provides a selection message of protection/non-protection mode relative to the information to be recorded, such as audio and/or video information. In this situation, the display 20, by way of the third node 17, displays the protection/non-protection selection message, as shown in FIG. 3 (step 26). The controller 16 then checks the protection/non-protection selection data input via the second node 15 from the user relay 18 and then decides whether there is a protection request of the information to be recorded (step 28). If a protection request has been made with regard to the information to be recorded, that is, "YES" icon on the protection/non-protection selection message is clicked in the step 28, then the controller 16 sets the protection mode flag to "1" to establish the protection mode of the information to be recorded (step 30).

After performing the step 30, the controller 16 displays a password request message on the display 20 and at the same time initializes a value of time count into "0" (step 32). Next, the controller 16 checks whether the password is input via the second node 15 from the user relay 18 or not (step 34). If the password is not inputted in the step 34, then the controller 16 checks whether the time count value is "N" to thereby decide whether a certain time has elapsed (step 36). If the time count value is smaller than "N", then the controller 16 increments the time count value by "1" (step 38), and performs the step 34 again. Otherwise, if the password is input in the step 34, then the controller 16 stores the inputted password in the memory 22 by way of the fourth node 19 (step 40).

On the other hand, if there is not a protection request of the information to be recorded, that is, "NO" icon on the protection/non-protection selection message is clicked in the step 28, then the controller 16 retrieves the position data relative to the protection mode information already recorded on the lead-in area of the optical disc 10 when the time count value is "N" in the step 36, that is, when a certain time has elapsed or after the performance of the step 40 (step 42). Specifically, at this time, the optical pickup device 12 is moved into the lead-in area of the optical disc 10 under control of the controller 16 to pick up the protection mode information written into the lead-in area. The recording/reproducing portion 14 operating in the reproduction mode by means of the controller 16 reproduces the position data relative to the previously recorded information from the RF signal applied at the optical pickup device 12 and then supplies the reproduced position data to the controller 16 via the sixth node 23. In turn, the controller 16 stores the position data relative to the retrieved protection mode information, via the fourth node 19, in the memory 22 (step 42).

After performing the step 42, the controller 16 moves the optical pickup device 12 into the data area of the optical disc 10, and then allows the information on the input/output line 11 to be recorded on the data area by driving the optical pickup device 12 and the recording/reproducing portion 14 in the recording mode (step 46). The recording/reproducing portion 14 adds the position data and the synchronous pattern to the information from the input/output line 11 to generate the data stream in the shape required by the optical disc 10. This data stream passes through the optical pickup device 12 and is recorded on the data area of the optical disc 10. Also, the controller 16 compares the position data from the recording/reproducing portion 14 and the position data stored in the memory 22 and decides whether the recording position of the optical disc 10 in which the information is being currently recorded, is the start point of the previously recorded protection mode information (step 48).

If it is determined that the recording position of the optical disc 10 in which the information is being currently recording is the start point of the previously recorded protection mode information, then the controller 16 stops the recording operation by controlling the recording/reproducing portion 14 such that the data stream generated at the recording/reproducing portion is not delivered to the optical pickup device 12 (step 50). Next, the controller 16 allows the optical pickup device 12 to be positioned in the end point of the previously recorded protection mode information by moving the optical pickup device 12 in a radial direction of the optical disc (step 52). In turn, the controller 16 restarts the recording operation of the information, by controlling the recording/reproducing portion 14 in such a manner that the data stream generated at the recording/reproducing portion 14 is delivered into the optical pickup device 12 (step 54). After the performance of the step 54, the controller 16 returns to the step 48. As a result, the controller 16 allows new information not to be overwritten on the previously recorded information of the protection mode by carrying out the steps 48 to 54 repeatedly until the information supplied via the input/output line 11 is terminated. In other words, if the previously recorded information protection mode information is present in the course of recording new information, then the controller 16 jumps the recording position into the end point of the protection mode information region.

On the other hand, if it is determined that the recording position of the optical disc 10 in which the information is being currently recorded, is not the start point of the previously recorded protection mode information in the step 48, then the controller 16 checks whether a termination code is input from the recording/reproducing portion 14 or a recording termination instruction is input from a user (step 56). When neither the termination code nor the recording termination instruction is input in the step 56, the controller 28 returns to the step 46. Herein, the termination code is included in the end point of the information supplied with the input/output line 11, and is transferred from a data source not shown. Otherwise, when either the termination code or the recording termination code is input in the step 56, the controller 28 moves the optical pickup device 12 into the lead-in area of the optical disc 10 while simultaneously supplying the information related to the overwriting prevention information to the recording/reproducing portion 14, thereby allowing the information related to the overwriting prevention information to be recorded on the lead-in area of the optical disc 10 (step 58). This overwriting prevention information contains a title of information or program, a protection mode flag, a password and recording position data, etc.

On the other hand, if not in the recording mode, that is, the recording mode flag is reset to "0" in the step 24, then the controller 16 checks a protection/non-protection change mode flag of the information and decides whether the information protection/non-protection change mode flag was set or not (step 60). If the information protection/non-protection change mode flag was set in the step 60, then the controller 16 retrieves the overwriting prevention information recorded on the lead-in area of the optical disc 10, and then stores the retrieved information in the memory 22 and displays it on the display 20 as described in FIG. 3. At this time, the optical pickup device 12 is moved into the lead-in area of the optical disc 10 and picks up the data recorded on the area. The recording/reproducing portion 14, operating in the reproduction mode based on the controller 16, reproduces the overwriting prevention information from the RF signal applied at the optical pickup device 12 and supplies the reproduced overwriting prevention information via the sixth node 23 to the controller 16. Also, the controller 16 stores the retrieved overwriting prevention information in the memory 22 by way of the fourth node 19.

In turn, the controller 16 displays the retrieved overwriting prevention information, via the third node 17, on the display 20 together with a cursor. The overwriting prevention information is composed of a title of program arranged in accordance with the information recorded on the data area of the optical disc 10, a recording interval representing a length of the information, and a protection/non-protection state. The cursor is expressed in black and can be moved up and down in accordance with a selection of user.

After performing the step 62, the controller 16 checks whether a protection/non-protection change instruction, a cursor movement instruction or an update instruction, etc. are input or not (steps 64 to 68) as shown in FIG. 2b.

If the protection/non-protection instruction is input in the step 64, then the controller 16 checks whether the selected information, that is, the information on which the cursor is positioned, is the protection mode information or not (step 70). If the information selected in the step 70 is the protection mode information, then the controller 16 retrieves the overwriting prevention information stored in the memory 22 and decides where there is a password input previously or not (step 72). If there is the previously input password, then the controller 16 allows an input message of the password to be displayed on the display 20, and thereafter inputs the password via the second node 15 from the user relay 18 (step 74). Next, the controller 16 compares the input password with the previous password and decides whether the present user is an admitted user (step 76). If it is determined that the present user is not an admitted user, that is, the input password is different from the previous password, then the controller 16 returns to the step 74. Otherwise, if it is determined that the present user is an admitted user, that is, the input password is identical to the previous password or there is not a previously input password in the step 72, then the controller 16 resets the protection mode flag of the selected information to "0" and release the protection mode of the information. In turn, the controller 16 updates the information mode flag stored in the memory 22 to the changed information mode flag and then returns to the step 64.

Otherwise, if the selected information is the information of the non-protection mode flag in the step 70, then the controller 16 sets the protection mode flag to "1" and establishes the protection mode with reference to the selected information (step 80). Next, the controller 16 displays a password request message on the display 20 and simultaneously initializes a value of time count into "0" (step 82). In turn, the controller 16 checks whether a password is input from the user relay 18 via the second node 15 or not (step 84). If a password is not input in the step 84, then the controller 16 checks whether the time count value is "N" and decides whether a certain time has elapsed (step 86). If the time count value is smaller than "N", the controller 16 increments the time count value by "1" (step 88) and then performs the step 84 again. Otherwise, if a password is input in the step 84, then the controller 16 stores the inputted password and the protection mode flag in the memory 22 and then returns to the step 64 (step 90).

Figure 6:
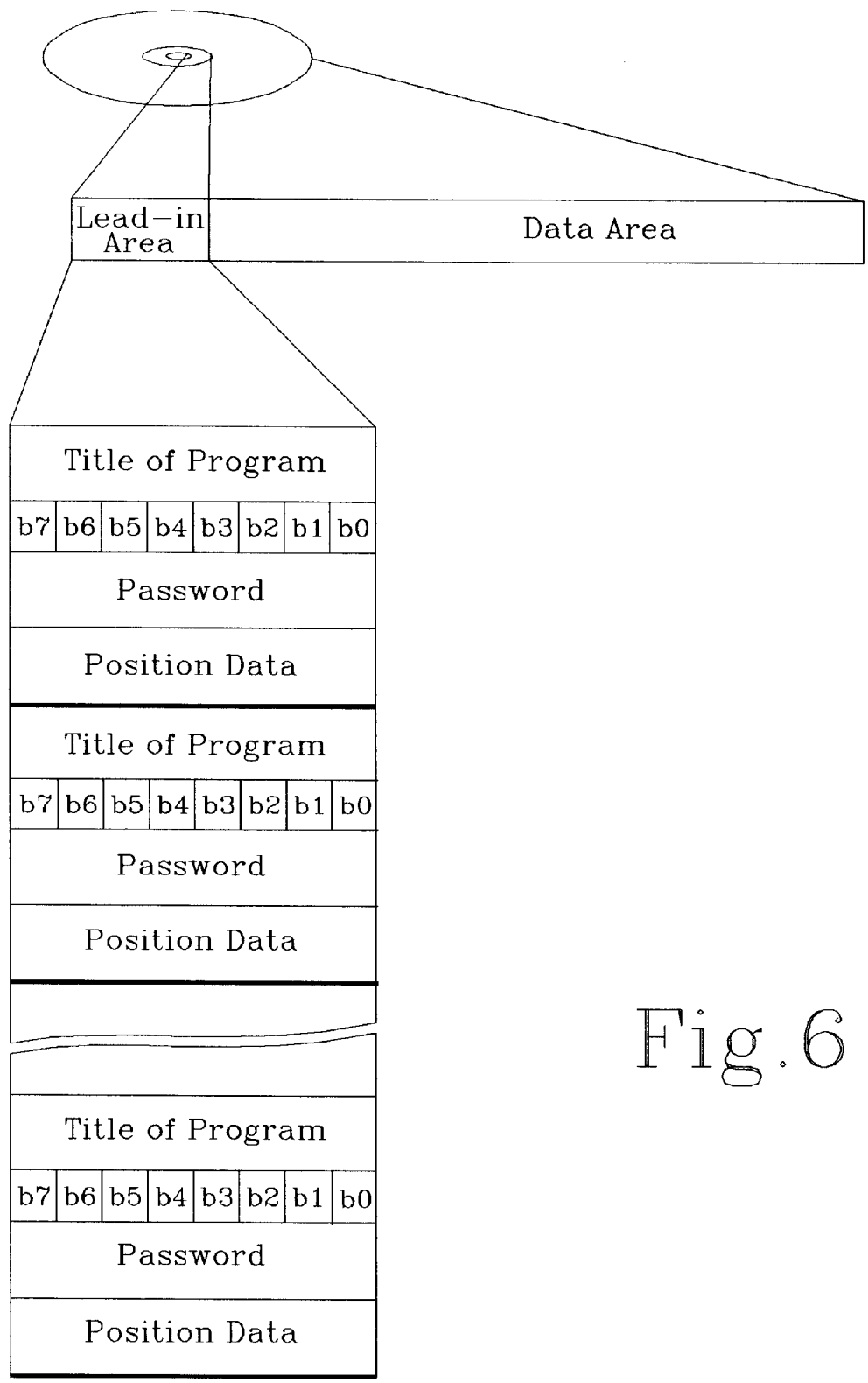
FIG. 6 shows a record format of an optical disc according to the embodiment of the invention.

FIG. 6 illustrates a record format of an optical disc according to the first embodiment of the present invention. In FIG. 6, the optical disc 10 is largely divided into a lead-in and a data area. In this data area is stored video and/or audio information or programs. While in the lead-in area is recorded a number of overwriting prevention information corresponding to the video and/or audio information stored in the data area. The overwriting prevention information includes a title of the program recorded on the data area, mode flags of 1 byte, a password and position data indicating a position of the data area on which the program is recorded, etc.. In the mode flags of 1 byte, the lowest order mode flag is used as a protection mode flag indicating the protection/non-protection state and the next least order mode flag is used as a password mode flag indicating the state in which the password is input. The password mode flag is set when the password is input and is reset when the protection mode flag is reset.

As described above, when recording of video and/or audio information, the present invention selects the protection mode corresponding to the information. When the video and/or audio information has been recorded, the present invention records on the lead-in area of the optical disc the overwriting prevention information containing a title of the information, a position data relative to the recording position and data concerning protection or non-protection. Also, the invention displays the protection/non-protection modes relative to the audio and/or video data recorded on the optical disc and allows a user to selectively change the protection/non-protection mode with reference to each audio and/video information. Further, the invention restricts a protection/non-protection mode change of audio and/or video information in accordance with a user by allowing a user to input the password. Moreover, if the previously recorded information of the protection mode presents in the course of recording new audio and/or video information, then the invention jumps the recording region of said information. Accordingly, the invention provides an advantage in that it selectively protect the audio and/or video information recorded on the optical disc so that it is possible to prevent the waste of storage area due to the unnecessary information and also to utilize the storage area effectively.

Figure 7A:
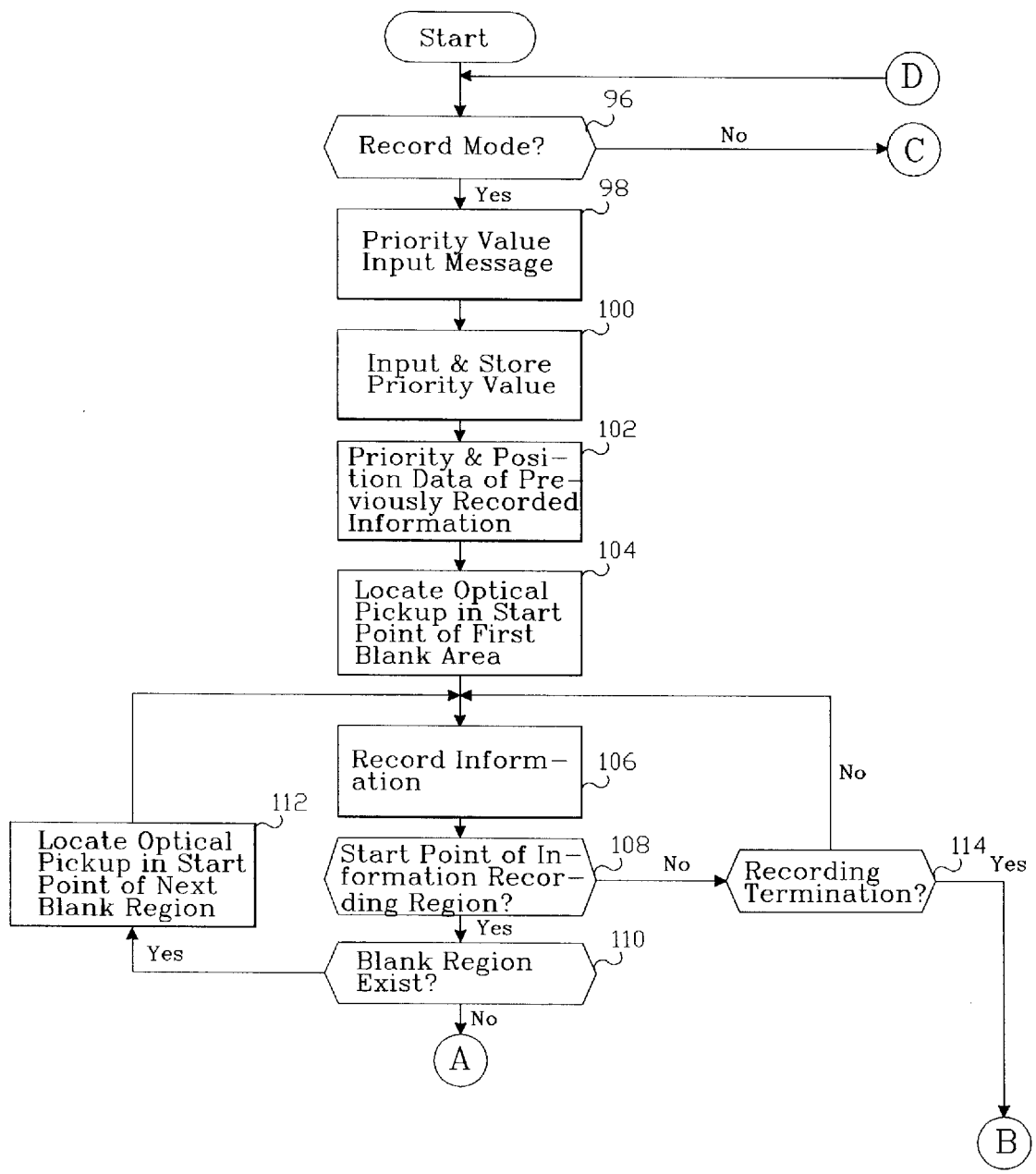
FIGS. 7a, 7b, and 7c collectively illustrate a flow chart of an information recording method with an optimization function of record medium according to the second embodiment of the present invention.
Figure 7B:
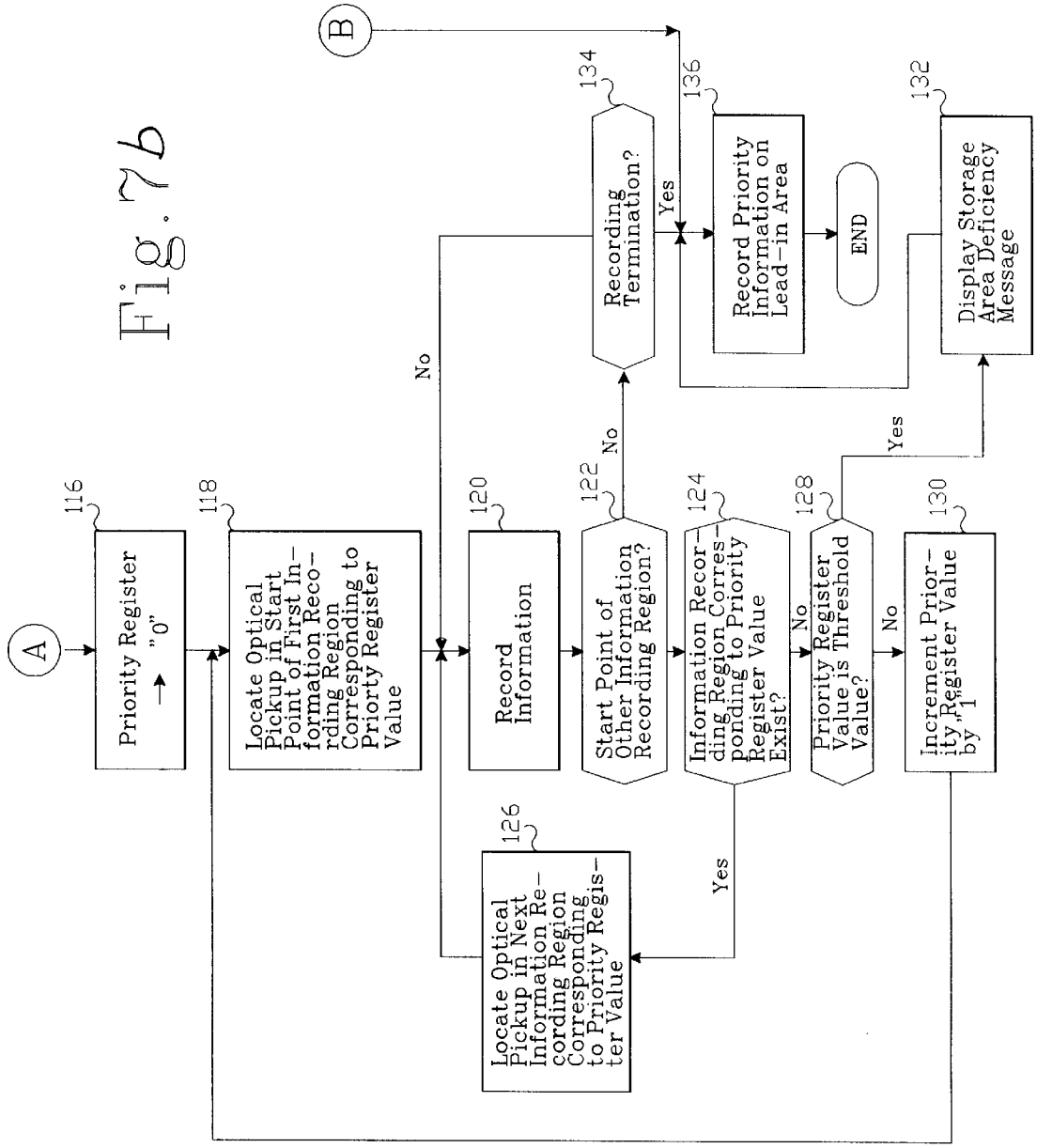
Figure 7C:
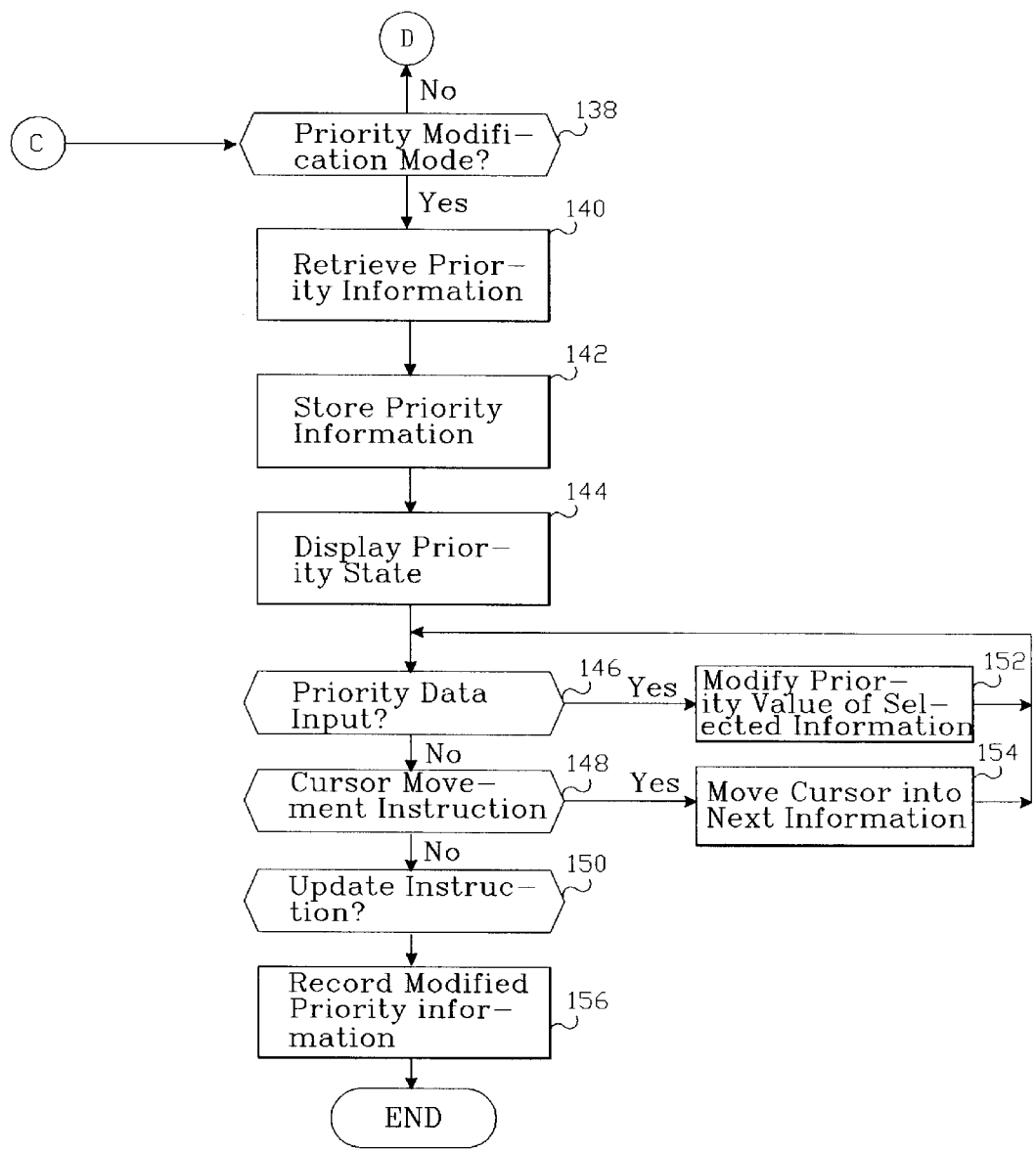

FIGS. 7a, 7b, and 7c collectively define a flow chart for explaining an information recording method capable of optimizing space on a recording medium according to the second embodiment of the present invention. The process in FIGS. 7a, 7b, and 7c is performed by the controller 26 shown in FIG. 1. Each step of said process will be described below in detail.

Firstly, in the step 96, the controller 16 checks a logical state of the recording mode flag allocated to the register therein and decides whether the recording mode was established. This recording mode flag is set to "1" when a recording instruction is input from the user relay 18, and thereafter is reset to "0" when other recording media drive instructions such as a stop instruction or a reproducing instruction are input. If the recording mode has been established, that is the recording mode flag is set to "1" in the step 96, then the controller 16 supplies an input message of the erase priority value relative to the information (i.e. Audio and/or video program) via the third node 17 to the display 20 and allows the display 20 to display the input message of priority value (step 26). Next, the controller 16 inputs the priority value via the second node 15 from the user relay 18 and stores the priority value via the fourth node 19 into the memory 22 (step 100). In turn, the controller 16 reads out the priority values recorded on the lead-in area of the optical disc 10 and the priority information containing the position data (step 102). At this time, the optical pickup device 12 is moved into the lead-in area of the optical disc 10 under the control of the controller 16 to pick up the data recorded on the area. The recording/reproducing portion 14, operating in the reproduction mode by the controller 16, reproduces the priority information relative to the information recorded on the data area based on the RF signal applied at the optical pickup device 12 and supplies the reproduced priority information via the sixth node 23 to the controller 16. The controller 16 stores the priority information input via the sixth node 23 from the recording/reproducing portion 14, via the fourth node 19, into the memory 22.

After performing the step 102, the controller 16 moves the optical pickup device 12 into a start point of the first blank region in the data area of the optical disc 10 (step 104). Next, the controller 16 drives the optical pickup device 12 and the recording/reproducing portion 14 in the recording mode, thereby allowing the information on the input/output line 11 to be recorded on the first blank region in the data area of the optical disc 10 (step 106). Also, the recording/reproducing portion 14 adds the position data and the synchronous pattern to the information from the input/output line 11 to generate the data stream in the shape requested by the optical disc 10. This data stream is recorded on the data area of the optical disc 10 via the optical pickup device 12. Further, the controller 16 compares the position data from the recording/reproducing portion 14 with the position data stored in the memory 22, and then decides whether the recording position of the optical disc 10 in which the information is currently being recorded, is the start point of the previously recorded information or not (step 108). If it is determined that the recording position of the optical disc 10 in which the information is currently being recorded, is the start point of the previously recorded information in the step 108, then the controller 16 decides whether there is the blank region, by checking the priority information recorded in the memory 22 (step 110). When there is a blank region detected in the step 110, the controller 16 allows the optical pickup device 12 to be located on the start point of the next blank region by moving the optical pickup device 12 in a radial direction of the optical disc 10, and thereafter returns to the step 106 (step 112). On the other hand, if it is determined that the recording position of the optical disc 10 in which the information is currently being recorded, is not the start point of the previously recorded information, then the controller 16 checks whether a termination code is input from the recording/reproducing portion 14 or a recording termination instruction is input by a user (step 114). If the recording has not terminated in the step 114, then the controller 16 returns to the step 106. As a result, the controller 16 allows all the new information to be recorded on the blank regions, by carrying out the steps 48 to 54 repeatedly until the recording of the information supplied via the input/output line 11 is completed. In other words, if the previously recorded information is encountered in the course of recording new information, then the controller 16 moves the recording position into the start point of the next blank region beyond the recording region of that previously recorded information. Herein, the termination code includes an end point of the information supplied with the input/output line 11, which is transferred from a data source (not shown).

Meanwhile, if a blank region remains, then the controller 16 initializes a value of the priority register allocated to one of the registers therein (step 116) as shown in FIG. 7b. Next, the controller 16 moves the optical pickup device 12 into the start point of the previously recorded region in the data area of the optical disc 10, on which the first information having a priority corresponding to the value of priority register is recorded (step 118). In turn, the controller 16 allows the information on the input/output line 11 to be recorded on the recording region of the first information having a priority corresponding to the value of priority register, by driving the optical pickup device 12 and the recording/reproducing portion 14 in the recording mode (step 120). Further, the controller 16 compares the position data from the recording/reproducing portion 14 with the position data stored in the memory 2 and decides whether the recording position of the optical disc 10, in which the information is being currently recorded, is the start point of the previously recorded next information (step 122). If it is determined that the recording position of the optical disc 10, in which the information is being currently recorded, is the start point of the previously recorded next information in the step 122, then the controller 16 checks the priority information recorded in the memory 22 and decides whether the next information recording region corresponding to the value of priority register remains (step 124). When the next information recording region corresponding to the value of priority register remains in the step 124, the controller 16 allows the optical pickup device 12 to be located on the start point of the next information recording region having a priority corresponding to the value of priority register, by moving the optical pickup device 12 in a radial direction of the optical disc 10 (step 126). As a result, the controller 16 allows new information to be overwritten on the previously recorded information regions corresponding to the values of priority register by carrying out the steps 118 to 126 repeatedly until the recording of the information supplied via the input/output line 11 is completed.

Figures 8, 9:
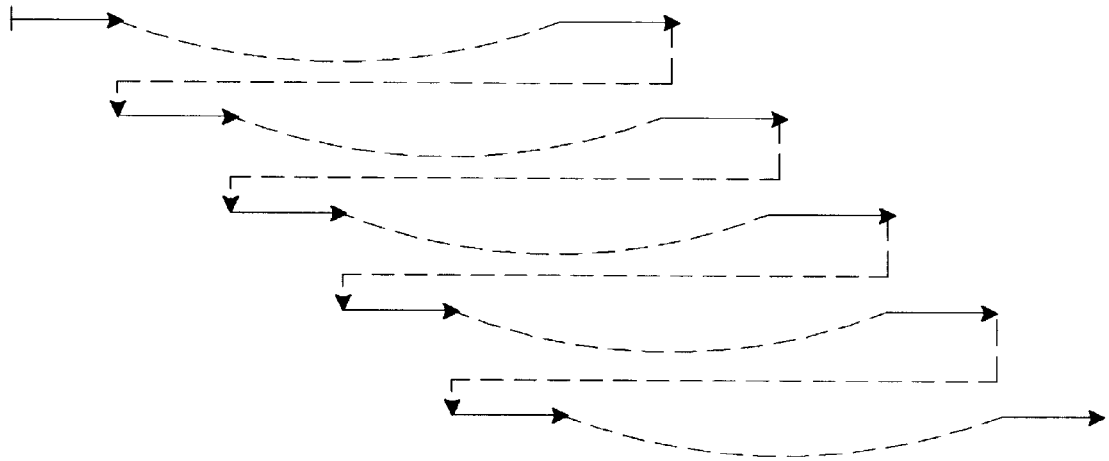
FIG. 8 shows a display scene of the previously recorded programs in which priority numbers are given.
FIG. 9 explains a state in which information is recorded on a record medium in accordance with the second embodiment of the invention.

On the other hand, if the information recording region corresponding to the value of priority register does not remain then the controller 16 decides whether the value of priority register has arrived at the threshold value or not (step 128). If the value of priority register has not arrived at the threshold value in the step 128, then the controller 16 increments the value of priority register by "1" and thereafter returns to step 118 (step 130). As a result, the controller 16 allows new information to be overwritten on the information recording regions extending from the least priority information recording region to the most priority region by carrying out the steps 118 to 130 repeatedly. Specifically, the new information, as shown in FIG. 8, is recorded on the first information recording region of first priority and thereafter is recorded on the second information recording region of second priority beyond the information recording regions of second to fifth priorities, to thereby be overwritten on the first priority information region. Further, the new information is recorded on the first information recording region of second priority and thereafter is recorded on the second priority information recording region beyond the third to fifth priority information recording regions and the overwriting region, to thereby be overwritten on the second priority information recording region. In this manner, the new information can be overwritten up to the fifth priority information recording region.

On the other hand, if the value of priority register has arrived at the threshold value in the step 128, then the controller 16 displays a storage area deficiency message on the display 20 (step 132). Meanwhile, if it is determined that the recording position of the optical disc 10 in which information is not being currently recorded, has not arrived at the start point of the previously recorded next information, then the controller 16 checks whether a termination code is input from the recording/reproducing portion 14 or a termination instruction is input by a user (step 134). If a recording has not been completed in the step 134, then the controller 16 returns to the step 120. Further, after performing the step 132, or when a recording has been completed in the steps 114 and 134, the controller 16 allows the priority information to be recorded on the lead-in area of the optical disc 10, by moving the optical pickup device 12 in the lead-in area of the optical disc 10 and at the same time supplying the priority information relative to the new recorded information with the recording/reproducing portion 14 (step 136). This priority information includes a title of the new recorded information on the data area, a priority value and recording position data, etc.

In the meantime, if in the recording mode, that is, the recording mode flag has been reset to "0", then the controller 16 checks a priority modification mode flag of the information and decides whether the priority modification mode of the information has been established or not (step 138 in FIG. 7c). If the priority modification mode of the information has been established in the step 138, then the controller 16 reads out the priority information recorded on the lead-in area of the optical disc 10 (step 140), and then stores the read priority information, via the fourth node 19, into the memory 22 (step 142). In turn, the controller 16 displays the priority information relative to the information or programs recorded on the data area on the display 20, as shown in FIG. 9, along with a cursor (step 144). The priority information displayed on the display 20 consists of a title of program arranged in accordance with the information recorded on the data area of the optical disc 10, a recording time interval representing a length of information and a priority value. The cursor is expressed in the black color and moved above and below by a selection of user.

After performing the step 144, the controller 16 checks whether a priority value, a cursor movement instruction or an update instruction or the like are input or not (steps 146 to 150). If a priority value is input in the step 146, then the controller 16 stores the input priority value, instead of the priority value relative to the selected information, that is, the information indicated by the cursor into the memory 20 and modifies the priority value (step 152). When a cursor movement instruction is input in the step 148, the controller 16 moves the cursor displayed on the display 20 toward the next information positioned above or below and thereafter returns to the next step 146 (step 154).

Further, if an update instruction is input in the step 150, then the controller 16 moves the optical pickup device 12 into the lead-in area of the optical disc 10 and at the same time delivers the modified priority information from the memory 22 into the recording/reproducing portion 14, thereby allowing the modified priority information to be recorded on the lead-in area of the optical disc 10 (step 156).

Figure 10:
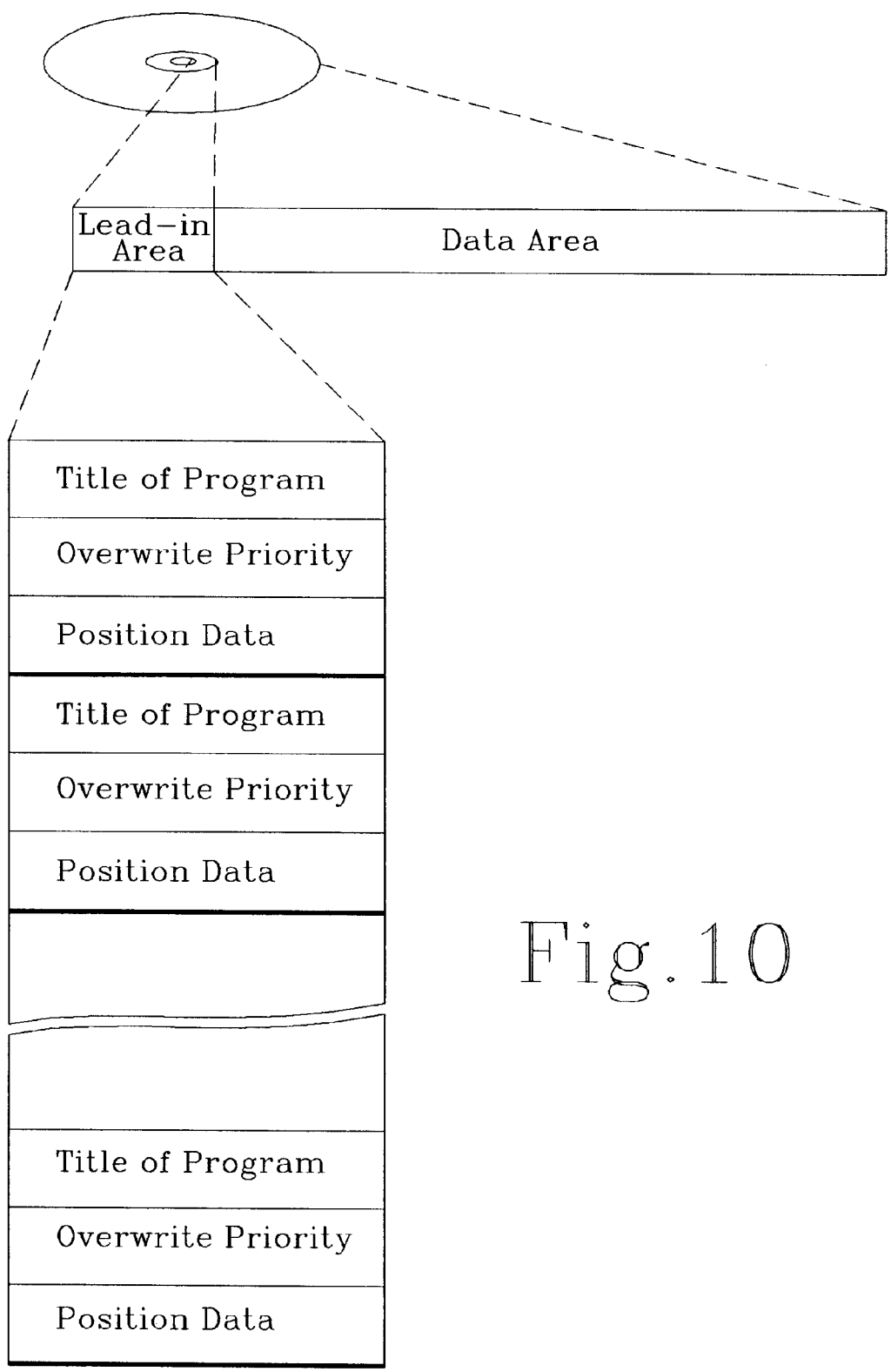
FIG. 10 shows a record format of optical disc according to the second embodiment of the invention.

FIG. 10 illustrates a record format of an optical disc according to the second embodiment of the present invention. In FIG. 10, the optical disc 10 is mainly divided into a lead-in and a data area. In this data area is stored video and/or audio information or programs. While in the lead-in area is recorded multiple priority information relative to the video and/or audio information stored in the data area. The priority information includes a title of the program recorded on the data area, a priority value and position data indicating a position of the data area on which the program is recorded, etc.

As described above, when recording of video and/or audio information, the present invention selects the protection mode relative to the information. Then, when the video and/or audio information has been recorded in the data area, the present invention records on the lead-in area of the optical disc the overwriting prevention information containing a title of the information, position data relative to the recording position and data concerning protection or non-protection. Also, the invention displays the protection/non-protection modes relative to the audio and/or video data recorded on the optical disc, thereby allowing a user to selectively change the protection/non-protection mode with reference to each audio and/video information. Further, the invention restricts a protection/non-protection mode change of audio and/or video information in accordance with a user by allowing a user to input the password. Moreover, if the previously recorded information in the protection mode is encountered in the course of recording new audio and/or video information, then the invention jumps the recording region of the previously recorded information. Accordingly, the invention provides an advantage in that it selectively protects the audio and/or video information recorded on the optical disc so that it is possible to prevent the waste of storage area due to the unnecessary information and also to utilize the storage area effectively.

As described above, recording audio and/or video information, an information recording method according to the second embodiment of the invention inputs a priority value of the information and records new audio and/or video information on the data area of the optical disc. Thereafter, when the audio and/or video information has been recorded on the data area, it records priority information containing a title of that information, position data relative to the recording position, and a priority value on the lead-in area of the optical disc. The invention allows a user to selectively change the protection/non-protection modes relative to audio and /or video information recorded on the optical disc in accordance with each of audio and/or video information by displaying the protection/non-protection modes. Moreover, an information recording method according to the second embodiment of the invention allows new audio and/or video information to be recorded on a blank storage area and then allows that new audio and/or video information to be overwritten on the information record areas in accordance with a sequence, from lower priority of information record areas to higher priority of information record areas, in the case that no blank areas exist.

Although the present invention has been described by the preferred embodiments illustrated in drawings hereinbefore, it is apparent from the above description to those ordinarily skilled in the art that various changes and modifications of the invention is possible without departing from the spirit thereof. For example, an optical disc has been employed as a record medium in the embodiments, but the invention may be applicable to other record media besides the optical disc. Also, it has been described that the recording position information of reference video data is recorded on the lead-in area of the optical disc, but it may be recorded on a specific area instead of the lead-in area.

Accordingly, the scope of the invention should be determined not by the embodiments illustrated and described, but by the appended claims and their equivalents.

What is claimed is:

1. A method of recording data on an optical disc, comprising:

receiving a request to record new data on the optical disc;

determining where on the optical disc the new data is to be recorded based on a priority level of any previously recorded data on the optical disc, said previously recorded data having more than two possible priority levels, the priority level being assigned by the user; and recording the new data on the optical disc in accordance with the determination.

2. The method of claim 1, further comprising a step of assigning more than two possible priority levels to the recorded new data.

3. The method of claim 2, further comprising a step of assigning priority levels to the new data by recording mode flags and password data into a lead-in region of the optical disc.

4. The method of claim 2, further comprising a step of assigning priority levels to the new data by recording overwrite priority data into a lead-in region of the optical disc.

5. A method of recording data on an optical disc, comprising:

determining a priority level from more than two priority levels to be assigned to first data, the priority levels indicating portions of the first data to be overwritten;

determining locations on the optical disc where the first data are to be recorded;

recording the first data at the determined locations; and assigning the priority levels to the first data, the priority levels being assigned by the user.

6. The method of claim 5, wherein the step of assigning priority levels is achieved by recording mode flags and password data into a lead-in region of the optical disc.

7. The method of claim 5, wherein the step of assigning priority levels is achieved by recording overwrite priority data into a lead-in region of the optical disc.

8. The method of claim 5, further comprising a step of recording second data over the first data in accordance with the priority levels of the first data.

9. The method of claim 8, further comprising the step of assigning more than two priority levels to the recorded second data.

10. A method of overwriting data on an optical disc, comprising:

selectively recording first data at different portions of the optical disc;

assigning a priority from more than two levels of priority to each selectively recorded portion of first data, the priorities assigned by the user indicating portions of the first data to be overwritten by second data;

selectively recording second data over the recorded first data portions in accordance with the assigned priorities of the first data.

11. The method of claim 10, further comprising a step of assigning a priority from more than two levels of priority to each selectively recorded portion of the second data.

12. The method of claim 10, wherein the priorities of the selectively recorded portions of first data are changed after assignment.

* * * * *